US008983903B2

(12) United States Patent
Kamei

(10) Patent No.: US 8,983,903 B2
(45) Date of Patent: Mar. 17, 2015

(54) DATA PROCESSING SYSTEM

(76) Inventor: Asao Kamei, Meguro-ku (JP)

( * ) Notice: Subject to any disclaimer, the term of this patent is extended or adjusted under 35 U.S.C. 154(b) by 762 days.

(21) Appl. No.: 13/228,280

(22) Filed: Sep. 8, 2011

(65) Prior Publication Data

US 2012/0330983 A1 Dec. 27, 2012

(30) Foreign Application Priority Data

Feb. 9, 2011 (JP) .................................. 2011-25641

(51) Int. Cl.
*G06F 17/30* (2006.01)

(52) U.S. Cl.
USPC .......................................................... 707/610

(58) Field of Classification Search
None
See application file for complete search history.

(56) References Cited

U.S. PATENT DOCUMENTS

2004/0210445 A1* 10/2004 Veronese et al. .................. 705/1
2007/0136265 A1* 6/2007 Hunt et al. ........................ 707/4

FOREIGN PATENT DOCUMENTS

JP 10-149308 6/1998

* cited by examiner

*Primary Examiner* — Hung Q Pham
(74) *Attorney, Agent, or Firm* — Jordan and Hamburg LLP

(57) ABSTRACT

An object of the present invention is to provide a data processing system which makes it possible to reflect data in a data aggregate of another party, with the mutual relational properties of the data preserved, in a case in which there has been a modification, addition, or the like in any of at least two data aggregates. The data processing system has a data acquisition part for acquiring data recorded in a second data aggregate and described by a designated descriptor; an object generator for generating an object on the basis of the acquired data; a reference relation processor for determining, based on internal attributes, a reference relation among objects in a case in which two or more objects are generated; a save processor for saving the generated objects in a first data aggregate; and a relation updater for extracting, based on the reference relation determined by the reference relation processor, the "ID" in the internal attributes of an object on the referenced side, and using the extracted "ID" to update the internal attributes showing the reference of an object on the reference side.

4 Claims, 11 Drawing Sheets

Fig4

```
contact:
        contact_id='10',
        name='JOHN PATENT'

connect:
        connect_id='20',
        method='Tool A',
        contact_id='10'
```

Fig5

```
contact:
        contact_id='10',
        name='JACK TRADEMARK'
```

Fig6

```
contact:
        contact_id='15',
        name='JOHN PATENT'

connect:
        connect_id='20',
        method='Tool A',
        contact_id='10'
```

```
contact {
            contact_id  serial,
            name text
}
connect {
            connect_id  serial,
            method  text,
            contact_id  int
}
```

(b)

```
contact:
        contact_id = '10',
        name = 'JOHN PATENT'

connect:
        connect_id='20',
        method='Tool A',
        contact_id='10'
```

- CHARACTER STRING NOTATION Cena.dao_contact.get.10.set.name='JOHN PATENT'
- ARRAY NOTATION <input type="text" name="Cena[dao_contact][get][5][set][name]" value="JOHN PATENT" />
- JSON NOTATION

```
{
Scheme:"Cena",
Model:"dao_contact",
Type:"get",
ID:"5"
    set:{
  name:' JOHN PATENT'
 }
 }
```

Fig10

```
Cena.dao_contact.new.10.set.name='JOHN PATENT'
Cena.dao_contact.new.10.set.cotact_gender=1
Cena.dao_contact.new.10.set.cotact_type=2
Cena.dao_contact.new.10.set.cotact_date='2011-01-01'
Cena.dao_connect.new.11.set.connect_method='Facebook'
Cena.dao_connect.new.11.rel.contact_id=Cena.dao_contact.new.10
Cena.dao_connect.new.11.set.connect_type=1
```

Fig11

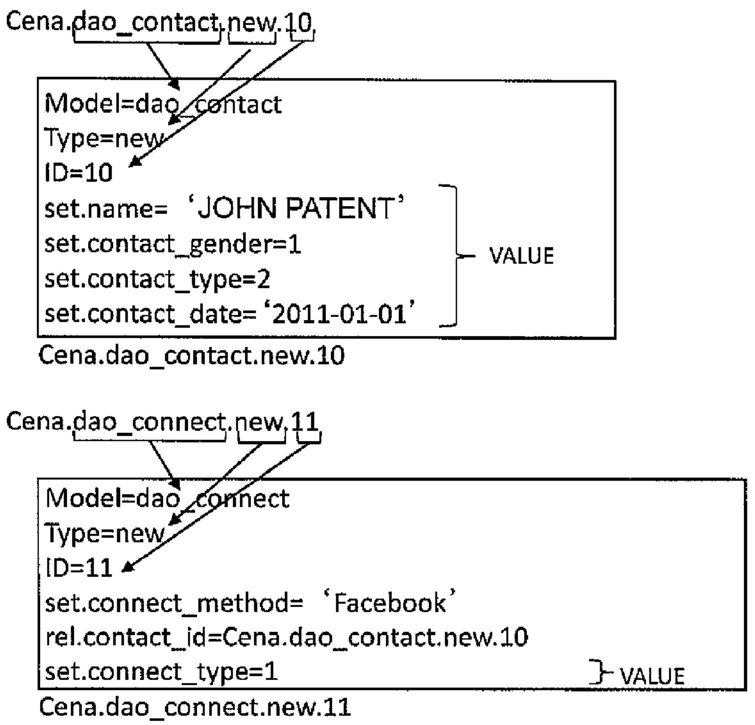

Cena.dao_contact.new.10

Model=dao_contact
Type=new
ID=10
set.name= 'JOHN PATENT'
set.contact_gender=1
set.contact_type=2
set.contact_date= '2011-01-01' } VALUE Cena.dao_contact.new.10

Cena.dao_connect.new.11

Model=dao_connect
Type=new
ID=11
set.connect_method= 'Facebook'
rel.contact_id=Cena.dao_contact.new.10
set.connect_type=1 } VALUE Cena.dao_connect.new.11

Fig 1 6

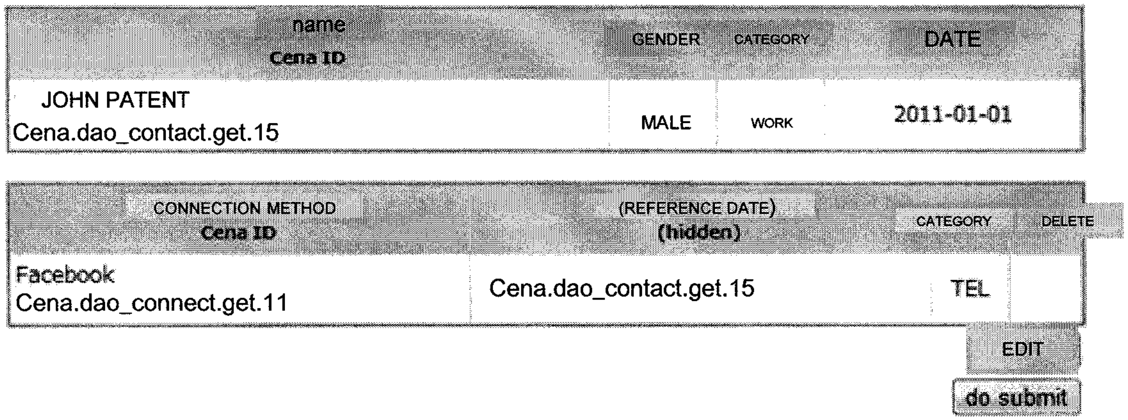

Fig 1 7

Cena.dao_contact.new.10.set.name='JOHN PATENT'
Cena.dao_connect.new.11.set.connect_method='Facebook'
Cena.dao_connect.new.11.rel.contact_id=Cena.dao_contact.new.10

| name | | | |
|---|---|---|---|
| Cena ID | GENDER | CATEGORY | DATE |
| JOHN PATENT Cena.dao_contact.get.15 | MALE | WORK | 2011-01-01 |

| CONNECTION METHOD | | | |
|---|---|---|---|
| Cena ID | (REFERENCE DATE) (hidden) | CATEGORY | DELETE |
| Facebook Cena.dao_connect.get.11 | Cena.dao_contact.get.15 | TEL | |

EDIT do_submit

Cena.dao_contact.new.10 → Cena.dao_contact.get.15
Cena.dao_connect.new.11 → Cena.dao_connect.get.11

DATA PROCESSING SYSTEM

BACKGROUND OF THE INVENTION

The present invention relates to a data processing system which makes it possible to reflect data in a data aggregate of another party, with the mutual relational properties of the data preserved, in a case in which there has been a data modification, addition, or the like in either aggregate of data (hereafter referred to as a data aggregate) in at least two data files, databases, or the like.

Various data aggregates are used for processing in computer terminals. In some cases, the data aggregates are related to each other. For example, primary keys are used to specify records when the data aggregates are relational databases. When a specific record in a table is referenced, the referenced destination is specified by the primary key of the record being referenced.

For example, let us consider a case of two systems, A and B, and let system B contain two tables, referred to as "contact" and "connect" (FIG. 4). Relational properties exist between two data because the data of the "connect_id=20" record of the "connect" table in system B references the record of the "contact" table where the "contact_id" is "10." On the other hand, it is assumed that system A contains a "contact" table with the same name as in system B (FIG. 5).

Thus, the two tables of system B are reflected as-is in system A. However, "10" is already used as a "contact_id" in system A, which is the reflection destination. In this case, the "contact_id=10" record of the "contact" table received from system B cannot be used in system A because the record is already in use. In view of this, another primary key, for example, "15," is assigned. The corresponding "contact" and "connect" tables in system A appear as in FIG. 6.

In FIG. 6, the data of the "connect_id=20" record in the table "connect" still references the "contact_id=10" record of the table. However, as stated above, the "contact_id=10" record of the "contact" table received from system B has been newly assigned as "contact_id=15" in system A, and the correct record to be originally referenced is the "contact_id=15" record. The referenced "contact_id" in the table "connect" thus remains unmodified even though the "contact_id" was newly assigned in the "contact" table, creating errors in the relational properties within the data.

Therefore, the relational properties between the two tables transferred from system B are not preserved in system A, and the "connect_id=20" data of the table "connect" in system A is correlated with a separate piece of data, which is "contact_id=10" of the table "contact."

In view of this, a device such as the one described, for example, in Patent Document 1 is used in order to solve these problems.

Patent Document 1: Japanese Laid-open Patent Application No. 10-149308

SUMMARY OF THE INVENTION

However, in Patent Document 1, status flags must be used in data processing, bringing about an increase in unnecessary data. The increase in the number of flags is acceptable when there is only one record, but when there is a large amount of records, that alone causes an increase in the amount of data. A method in which conversion tables are used without the use of status flags is also possible, but this approach requires that conversion tables be separately created and managed.

In light of the above-described problems, the present inventor perfected the data processing system according to the present invention.

The invention according to a first aspect is a data processing system for causing data recorded in a second data aggregate to be reflected in the first data aggregate, the data processing system having a data acquisition part for acquiring data that is generated on the basis of data recorded in the second data aggregate, and is described by a descriptor including at least "Model," "Type," and "ID" as attributes; an object generator for extracting, as an object name, designated attributes in the descriptor of the data acquired by the data acquisition part, setting the attributes in the descriptor as the internal attributes of an object, and generating the object by correlating the object name and the internal attributes; a reference relation processor for determining, based on the internal attributes, a reference relation among objects in a case in which two or more objects are generated; a save processor for saving the generated objects in the first data aggregate; and a relation updater for extracting, based on the reference relation determined by the reference relation processor, the "ID" in the internal attributes of an object on the referenced side, and using the extracted "ID" to update the internal attributes showing the reference of an object on the reference side.

Adopting a configuration such as the one used in the present invention makes it possible to create a situation in which modifying the primary key or other type of identification information ("ID") for data on the referenced side causes the internal attributes to change, but the object name in itself, which determines the relational properties, to remain unmodified, therefore preserving the individual relational properties.

The invention described above can also be configured as a data processing system wherein the object generator extracts, as an object name, at least "Model," "Type," and "ID" in the descriptor, sets the attributes in the descriptor as the internal attributes of an object, and generates the object by correlating the object name and the internal attributes.

It is preferable for at least "Model," "Type," and "ID" to be included as the object name.

The invention described above can also be configured as a data processing system wherein the object generator extracts, as an object name, at least "Model," "Type," and "ID" in the descriptor, sets the attributes in the descriptor as the internal attributes of an object, and generates the object by correlating the object name and the internal attributes; and wherein the save processor, in a case in which the same "ID" as the attributes of the "ID" in the descriptor is used in the first data aggregate when the generated object is saved, assigns an "ID" that is different from the "ID" in the descriptor, updates the "ID" in the internal attributes of the generated object with the assigned "ID", and saves the object to the first data aggregate.

A configuration such as the one adopted in the present invention can also be used in order to achieve the technological effect described above.

The invention according to a second aspect is a computer system for causing data recorded in a data aggregate to be reflected by being transferred to another data aggregate, wherein the data sent to the other data aggregate is extracted from among the data recorded in the data aggregate; the extracted data is generated by a descriptor including at least "Model," which is a character string for specifying a data classification, "Type," which indicates a classification of whether or not the data already exists in the data-receiving system, and "ID," which is a value for uniquely specifying data; and the data described by the descriptor is sent to a computer system provided with the other data aggregate, and the data is recorded in the other data aggregate by generating an object according to the attributes in the descriptor.

By being configured as described above, the invention according to the second aspect can provide the same technological effects as the invention according to the first aspect.

The data processing system described above can be implemented by loading and executing the program of the present invention on a computer terminal. Specifically, the invention can be configured as a data processing program wherein a computer terminal, for causing data recorded in a second data aggregate to be reflected in a first data aggregate, is adapted to perform the functions of: a data acquisition part for acquiring data that is generated on the basis of data recorded in the second data aggregate, and is described by a descriptor including at least "Model," "Type," and "ID" as attributes; an object generator for extracting, as an object name, designated attributes in the descriptor of the data acquired by the data acquisition part, setting the attributes in the descriptor as the internal attributes of an object, and generating the object by correlating the object name and the internal attributes; a reference relation processor for determining, based on the internal attributes, a reference relation among objects in a case in which two or more objects are generated; a save processor for saving the generated objects in the first data aggregate; and a relation updater for extracting, based on the reference relation determined by the reference relation processor, the "ID" in the internal attributes of an object on the referenced side, and using the extracted "ID" to update the internal attributes showing the reference of an object on the reference side.

Using the data processing system of the present invention allows the relational properties between data to be preserved without using flags even when there is a change in the relational properties of data with each other in a case in which data from a data aggregate is reflected in a separate aggregate.

BRIEF DESCRIPTION OF THE DRAWINGS

FIG. 4 is a view schematically showing an example of a table in system B;

FIG. 5 is a view schematically showing an example of a table in system A;

FIG. 6 is a view schematically showing an example of a table in system A;

FIG. 7 is a view schematically showing an example of a descriptor of data in the present invention;

FIG. 10 is a view schematically showing an example of recorded data;

FIG. 11 is a view schematically showing an example of an object on the basis of FIG. 10;

FIG. 16 is a view schematically showing an example of a screen showing the results of reflecting relational properties and saving data;

FIG. 17 is an example of data sent from system B to system A;

DETAILED DESCRIPTION OF THE INVENTION

Figure 1:
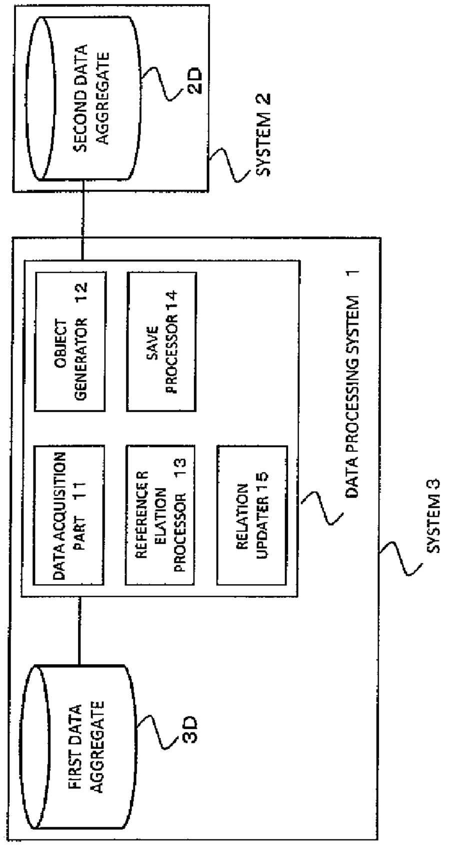
FIG. 1 is a conceptual diagram schematically showing an example of the overall configuration of the data processing system of the present invention.

The terms in the present document will be defined in order to explain the data processing system 1 of the present invention.

Information to be processed by the data processing system 1 of the present invention is designated as "data." As used herein, "data" has the meaning of any kind of source in the data processing system 1; for example, a database record, file, or the like. In other words, "data" is the object manipulated by using the data processing system 1 of the present invention.

An example of data in a database is shown in FIG. 7. FIG. 7(*a*) shows the definitions of the "contact" and "connect" tables of a database. A record provided with the definitions is shown in FIG. 7(*b*).

In the data processing system 1 of the present invention, data-showing objects are generated and processed in order to simplify data manipulation. As used herein, "object" refers to data that is captured as a cluster of related data and collectively shows the data-related process, taking up space in memory. For example, an array in JavaScript or the like is also defined as an object.

ORM (Object Relation Mapping) refers to expressing the records of a database using objects. In ORM, an object contains attributes that correspond to the items of a database record. The relation of a relational database can be set as a reference between objects by enabling referencing from object to object.

In the data processing system 1 of the present invention, a descriptor for uniquely expressing data is used to manipulate the data. In the present specification, the descriptor is called the "Cena descriptor."

The Cena descriptor is provided at least with the attributes "Model," "Type," and "ID." "Schema" may also be provided as an attribute. Specifically, the Cena descriptor may include "Model," "Type," and "ID," or "Schema," "Model," "Type," and "ID."

"Schema" is a character string for assigning the description method of a descriptor or the reference method of data. "Schema" can be omitted in cases in which the description method of a descriptor or the reference method of data is determined in advance. For example, the reference method of "Rdb" (Relational database) is indicated in cases in which "Rdb" is specified as "Schema." A reference method based on the descriptor used in the data processing system 1 of the present invention is indicated in cases in which "Cena" is specified. Accordingly, "Schema" assigns so-called protocol classifications, and can therefore be set arbitrarily.

"Model" is a character string for specifying a data classification. Examples include the class names necessary to indicate object instances, the table names of a database, model designations in the case of using database DI (Dependency Injection), and the like.

For example, object=Sql.table(Model) is true in a case in which "Model" is assumed to indicate a table name of a most basic database; object=new Model( ) is true in a case in which "Model" indicates a class name to generate an object; object=Model.factory( ) is true in a case in which "Model" is created from a method called "factory;" and object-DI.factory (Model) is true in a case in which an object is generated from a separate object. Thus, "Model" is not necessarily a table name or a class name, but is a character string for specifying an object (data) classification.

"Type" is a character string for indicating a determination classification as to whether the already existing data is present in a system that has received the data. For example, data on a server (system 2 of FIG. 1) is designated as "get," and the data created in a client (system 3 of FIG. 1) is described as "new."

"ID" is a value for uniquely specifying data; in a database, the "ID" would correspond to a primary key. "Model" and "Type" can each uniquely specify data by using the "ID."

Based on the above, specific data is specified by a descriptor having the three attributes of "Model," "Type," and "ID." According to a separate case, data may also specified by a descriptor having the four attributes of "Schema," "Model," "Type," and "ID." The attributes constituting the Cena descriptor may also include attributes other than those described above, and there is no restriction on the number of attributes.

For example, FIG. 4 is shown using the Cena descriptor. The "Model" is "dao_contact" in a case in which the records of the "contact" table are indicated by a class called "dao_contact." The data already exists in system B, for which reason "Type" is "get," and the primary key is "10." Specifically, the Cena descriptor is shown as "Cena.dao_contact.get.10." A case in which ORM is used is described below.

Once the data has been uniquely assigned, the assigned data can be manipulated. The manipulation involves setting the properties, setting the relations, manipulating the data itself, and the like. In other words, properties are included as attributes in the data. For example, in FIG. 4, the "contact" table includes "name" as a property. A relation can also be used as a special attribute. A relation is an attribute for referencing other data, and is therefore distinguished from a property, which is a simple value. For example, the table "connect" in FIG. 4 includes "method" as a property and is related to "contact_id='10'" as a relation. Thus, the manipulation content and data necessary for the manipulation are expressed after being added to the Cena descriptor of the object (data).

The manipulation content (Action) can be added to the data-assigning Cena descriptor. For example, the data is assigned by "Cena.dao_contact.get.10" in a case in which the "contact_id='10'" described above is deleted. "Action='del'," which shows the delete operation, is added to the Cena descriptor. Specifically, the Cena descriptor is "Cena.dao_contact.get.10.del."

It is also possible to add the manipulation content (Action) and the necessary property name to the data-assigning Cena descriptor, and to use the result as the data-assigning Cena descriptor. For example, modifying the name of the "contact_id='10'" described above causes this data to be assigned by "Cena.dao_contact.get.10." A property (name) and "Action='set'" showing the modify operation are added to the Cena descriptor, and a new value (for example, "John Patent") is assigned. Thus, the Cena descriptor becomes "Cena.dao_contact.get.10.set.name='John Patent'."

It is also possible to add the manipulation content (Action) and the necessary property name to the data-assigning Cena descriptor and to use the result as a Cena descriptor for indicating data to be referenced. For example, the data is assigned by "Cena.dao_connect.get.20" in a case in which the relation of the "connect_id='20'" described above is modified. A property (contact_id) and "Action='rel'" showing a relation-modifying manipulation are added to the Cena descriptor, and a relation with the Cena descriptor of the data to be referenced, for example, with "contact_id='20'," is assigned. Thus, the Cena descriptor becomes "Cena.dao_connect.get.10.rel.contact_id=Cena.dao_contact.get.20."

Specifically, whereas data in the Cena descriptor was uniquely specified in the past using only the primary key (or only the "ID") in the database of the descriptor, in this case data classifications and the like can be used jointly and the data can be uniquely specified from the Cena descriptor alone by using at least "Model," which is a character string for specifying a data class, "Type," which is a character string for specifying a data classification, and "ID," which is a value for uniquely specifying data. A variety of objects can also be assigned as attributes.

Several notation methods can be used for the Cena descriptor thus established. Examples include character string notation, array notation, JSON notation, and the like. These are shown schematically in FIG. 8. The Cena descriptor is not limited to the above-described notations, and any notation method may be adopted as long as the notation is configured from attributes including at least "Model," "Type," and "ID," or "Schema," "Model," "Type," and "ID." Character string notation involves delimiting the attributes of the Cena descriptor with a character string and a "." (period). Array notation involves substituting the attribute of the Cena descriptor as an attribute of an array. JSON notation is based on JavaScript Object Notation.

Next, the configuration and processes of the data processing system 1 in the present invention is described using the Cena descriptor configured as described above. In FIG. 1, an example of the overall configuration of the data processing system 1 is shown schematically. The data aggregate in the data processing system 1 may be an aggregate of any kind of data, that is, a database, a data file, a music file, an image file, or the like. In FIG. 1, the data processing system 1 is a case of two computer terminals (system 3 and system 2), each provided with a data aggregate, and the drawing shows the processes performed in a case in which data is added and reflected by being transferred from one computer terminal to the other computer terminal. However, the data processing system 1 may also be implemented using only one computer terminal.

Figure 2:
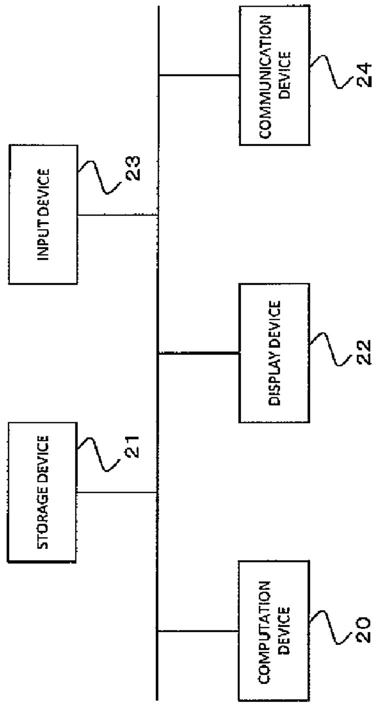
FIG. 2 is a conceptual diagram schematically showing an example of the hardware configuration of a computer terminal.

Each of the computer terminals has a CPU or other computation device 20 for performing the computation processes of a program; RAM or a hard disk or other storage device 21 for storing information; a display (screen) or other display device 22; a keyboard, or a pointing device (a mouse, a numeric keypad, or the like) or other input device 23; and a communication device 24 for sending and receiving, via the Internet or a LAN or other network, the processing results of the computation device 20 or the information stored in the storage device 21. The processing of the functions (means) implemented in the computer is implemented by the loading of a means (a program, a module, or the like) for performing the required processes into the computation device 20. In a case in which information stored in the storage device 21 is used in the processes, the functions retrieve applicable information from the storage device 21, and use the retrieved information as required in the processes performed by the computation device 20. An example of a hardware configuration of the computer terminal is shown schematically in FIG. 2. The functions of the computer terminal may also have a distributed arrangement in a plurality of computers or servers.

The functions of the means of the present invention are only distinguished logically, and may constitute the same field in physical or actual terms.

The data processing system 1 has at least two or more data aggregates, and various processors for processing the data aggregates.

A data aggregate is an aggregate of data such as that described above. Cases of a database are described below as the data aggregates in the present specification, but this arrangement is nonlimiting, and processes can be executed in the same manner with other options.

The processor in the data processing system executes processes in which the data in a data aggregate is reflected in another data aggregate while the data relational properties are preserved. The system has a data acquisition part 11, an object generator 12, a reference relation processor 13, a save processor 14, and a relation regenerator 15 as such processors.

The data acquisition part 11 acquires data on the basis of a Cena descriptor from the other data aggregate. For example, data that is reflected from the second data aggregate 2D (database B) in the first data aggregate 3D (database A) is acquired in the case of FIG. 1. The data thus acquired is described by the Cena descriptor.

The object generator 12 generates an object on the basis of data acquired by the data acquisition part 11. To generate the object, the attributes constituting the Cena descriptor are extracted, and the extracted attributes are set as the attributes of the object.

The reference relation processor 13 determines whether objects have reference relations when there are two or more objects generated. Specifically, the reference relation between two objects is determined based on the attributes that show a reference relation in the objects generated by the object generator 12.

When the reference relation processor 13 determines that there is a reference relation, the individual elements are related to each other, and a determination is made whether the "Type" shows that the correlated object was generated at the data reflection destination (for example, "get").

The save processor 14 saves an object generated by the reference relation processor 13 to a data aggregate (database). When the object is saved, an attribute of a designated number from the top (for example, three, four, or the like from the top) is extracted from among the Cena descriptors that show this object, the attributes are set as the object name, and the object name and the attributes are related to each other and saved in the first data aggregate 3D. At this time, the attributes of the object are updated and saved. The "Type" in the attributes of the saved object is updated to "get." Here, the reason "Type" is set to "get" is that the object was acquired from system 2 provided with the second data aggregate. Specifically, "Type" is updated to "get" and saved because the object is not originally in system 3.

The relation updater 15 can indicate a relation in the data aggregate after the save processor 14 has executed the save process in the data aggregate. Therefore, the relation updater 15 loads the "ID" in the saved object from the object having relational properties, and stores the "ID" after reflecting it in a correlated record.

Figure 3:
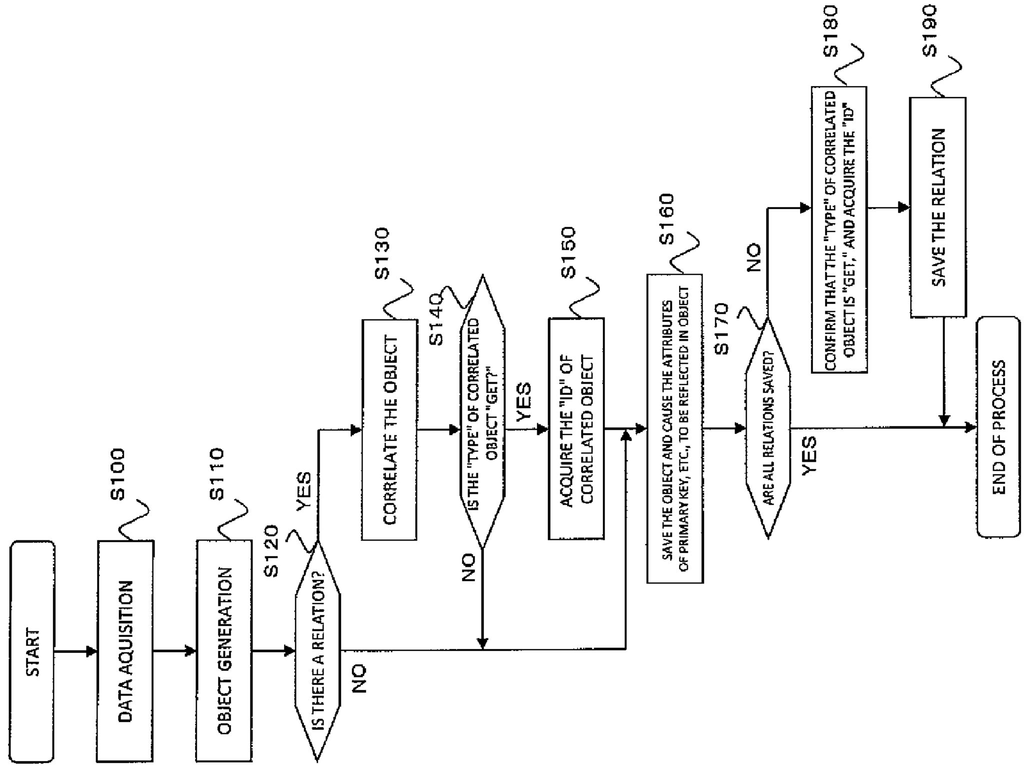
FIG. 3 is a view schematically showing an example of a flowchart using the data processing system of the present invention.

Next, the processes of the data processing system 1 of the present invention will be described using the flowchart of FIG. 3. The following describes a case in which data is transferred from the database (database B) of system 2, which is a server, to system 3, and is recorded in the database (database A) of system 3.

Figures 8, 9:
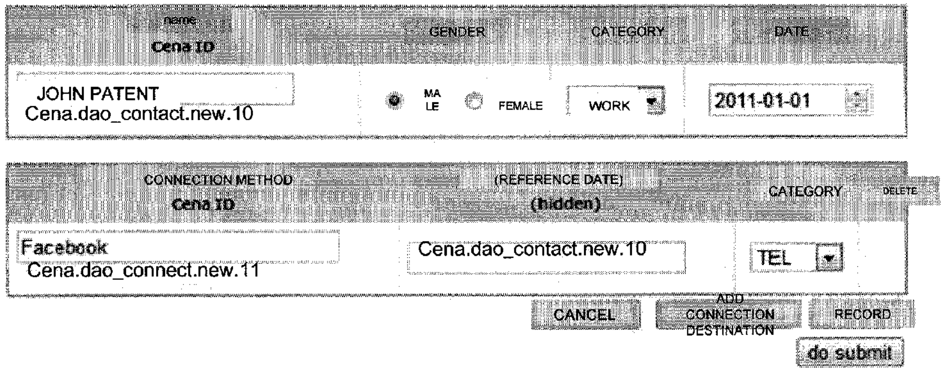
FIG. 8 is a view schematically showing an example of a notation method for a Cena descriptor.
FIG. 9 is a view schematically showing an example of a data recording screen.

First, data is added to the database B in system 2 by the input of data from the data recording screen shown in FIG. 9. The added data is as shown in FIG. 10 when the Cena descriptor described above is used.

In other words, inputting "John Patent" as the name, "Male" as the gender, "Work" as the category, and "2011-01-01" as the date stores these data after correlating the data to the primary key "10" of the "dao_contact" record (class) of the table "contact." Inputting "Facebook" as the connection method, "Cena.dao_contact.new.10" as reference data (associating data), and "TEL" as the category stores these data after correlating the data to the primary key "11" of the "dao_connect" record (class) of the table "connect." The Cena descriptor is converted based on these data. Selection and input from a drop-down menu or the like may be used instead of the input of attributes for the data. In particular, reference data may be automatically input based on a record, primary key, or the like of the other party to be associated. Input errors and the like can thereby be prevented.

Specifically, attributes such as the name "John Patent," the gender "Male," "the category "Work," and the date "Jan. 1, 2011," are correlated with the "Cena.dao_contact.new.10" Cena descriptor in the "dao_contact" record of the "contact" table and are stored in the database B. In addition, attributes such as the connection method "Facebook," the reference data "Cena.dao_contact.new.10," and the category "TEL" are correlated with the "Cena.dao_connect.new.11" Cena descriptor in the "dao_connect" record of the "connect" table and are stored in the database B. Only the name is shown for the Cena descriptor in FIG. 10 for the convenience of description, and the other attributes are omitted from the drawing, but the processes that follow can be performed in the same manner as in the case of a name.

A case of two objects from two records is shown in the above description, but there are also cases in which a record references itself and two objects are generated from one record.

Data based on the Cena descriptor generated by system 2 in the above manner is transferred to system 3 by a designated manipulation.

The data (data described by the Cena descriptor) transferred in this way is acquired by the data acquisition part 11 of the data processing system 1 of system 3 (S100).

The object generator 12 of the data processing system 1 generates an object on the basis of the data (data described by the Cena descriptor) acquired by the data acquisition part 11 (S110). This generates the object on the basis of the initial four attributes of "Schema," "Model," "Type," and "ID" within the descriptions provide by the Cena descriptor and acquired by the data acquisition part 11. Specifically, the second attribute can be specified as "Model," the third attribute can be specified as "Type," and the fourth attribute can be specified as "ID" by causing the character string of the "Schema" at the top to specify the information described by the Cena descriptor, and object attributes are generated based on these attributes. Object attributes are also generated for other portions.

Specifically, the fact of the Cena descriptor can be specified by the character string of the attributes at the top in "Cena.dao_contact.new.10." Therefore, the second attribute is specified as "Model," in other words, a data classification (a table name in the case of a database); the third attribute is specified as "Type," in other words, a data classification (newly added data, "new," or data created in system 3, "get");

the fourth attribute is specified as "ID," in other words, the fact of a value for uniquely specifying data; and the attributes are set as the attributes of an object. Additionally, the fifth and subsequent attributes are each set as a value and assumed to be an attribute of the object.

In this manner, an object is generated based on an attribute of a designated number from the top (for example, the fourth) from among the data acquired from system 3. In the case in which "Schema" is not used in the top part (a case in which the use of the Cena descriptor is always specified, among other cases), the object generator 12 automatically generates an object without using "Schema." A case of two objects based on FIG. 10 is shown in FIG. 11. Two objects are involved because there are two "Models," specifically, two database tables.

When the object generator 12 generates objects in S110, the reference relation processor 13 determines whether a reference relation exists between the generated objects. Specifically, the attributes of the objects are referenced, and it is determined whether there is a reference relation (S120).

When there is no reference relation, S160 and subsequent processes are executed. On the other hand, in the case in which there is a reference relation, S130 and subsequent processes are executed.

Figure 12:
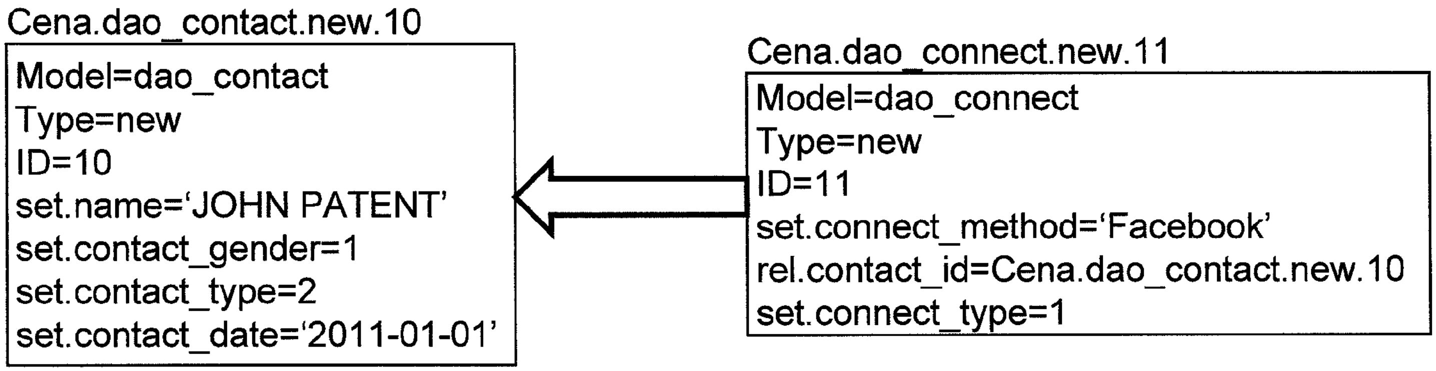
FIG. 12 is a view schematically showing a reference relation between two objects.

In the case of FIG. 11, the "Cena.dao_contact.new.10" object is referenced (rel.contact_id=Cena.dao_contact.new.10) by the "Cena.dao_connect.new.11" object. Therefore, the reference relation processor 13 can determine that there is a reference relation. This is shown schematically in FIG. 12.

Figure 13:
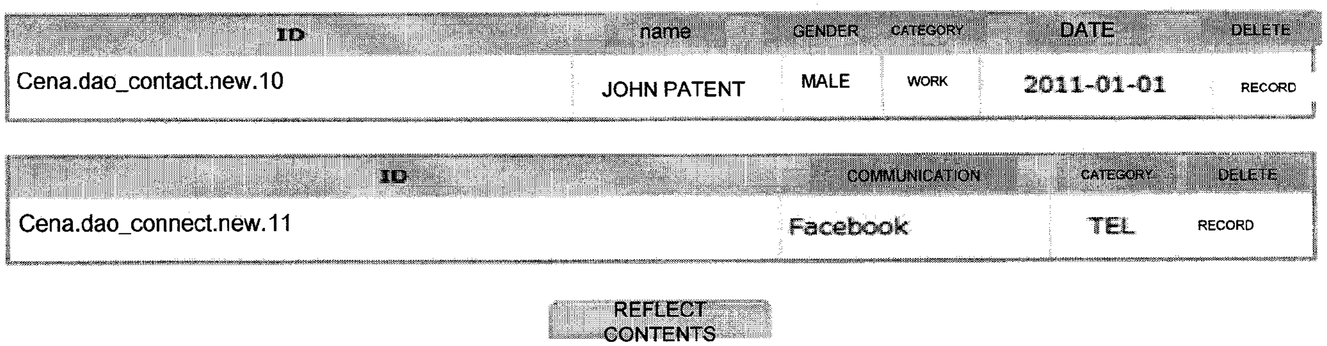
FIG. 13 is a view schematically showing an example of a screen that shows relational properties.

When the reference relation processor 13 determines that there is a reference relation, the individual elements are correlated for the objects determined to have a reference relation (S130). The correlation causes a screen such as the one shown in FIG. 13 to be displayed on the display device 22 in system 3, and allows receipt of an input indicating that this fact is reflected. In FIG. 13, "ID" is displayed, but a configuration in which there is no such display is also acceptable. The above-described correlation may also be performed using a so-called interdata link.

Even in the case in which it is determined by the reference relation processor 13 that there is no reference relation, the result may be displayed on the display device 22 for displaying the corresponding screen, and an input indicating that this fact is reflected may be received, or the process may be performed without receiving such an input.

When the reference relation processor 13 correlates objects in S130, the reference relation processor 13 determines whether the "Type" of the correlated objects is "get" (the "Type" that shows that the data has been created in a system other than system 3, which is the reflection destination for the data) (S140). "New" exists in addition to "get" as "Type," and "new" is a "Type" that shows that the data has been created in system 3, which is the reflection destination for the data. In other words, it is determined in S140 whether the data was created in the reflection destination system.

In the case in which the "Type" is "get," the "ID" of the object is acquired because the data was not created in system 3. Here, "10" is acquired as an "ID" for the "Cena.dao_contact.new.10" object, and "11" is acquired as an "ID" for the "Cena.dao_connect.new.11" object (S150). In the case in which the "Type" is "new," step S160 and subsequent processes are executed because the data was created in system 3.

After the process up to S150 is completed, specifically, once the relation is established between the object generated by the object generator 12 in S110 and the object correlated in S130, the save processor 14 saves the object generated by the object generator 12 in database A of system 3 (S160). This allows the attributes of the primary key (ID) and the like in the object to be reflected in database A as well.

In the case in which an object is saved in S160, the attribute of a designated number from the top (for example, three, four, or the like on from the top) is extracted from the Cena descriptor that shows the object, the attribute is set as an object name, and the object name and the attribute are correlated with each other and saved. The attribute of the object is updated and saved. "Type" is "get" in this case because system 3 saves the data received from system 2. This is shown schematically in FIG. 14. It is assumed in FIG. 14 that an "ID" of "10" is already being used and that 15" is allocated in the "contact" table.

Figure 14:
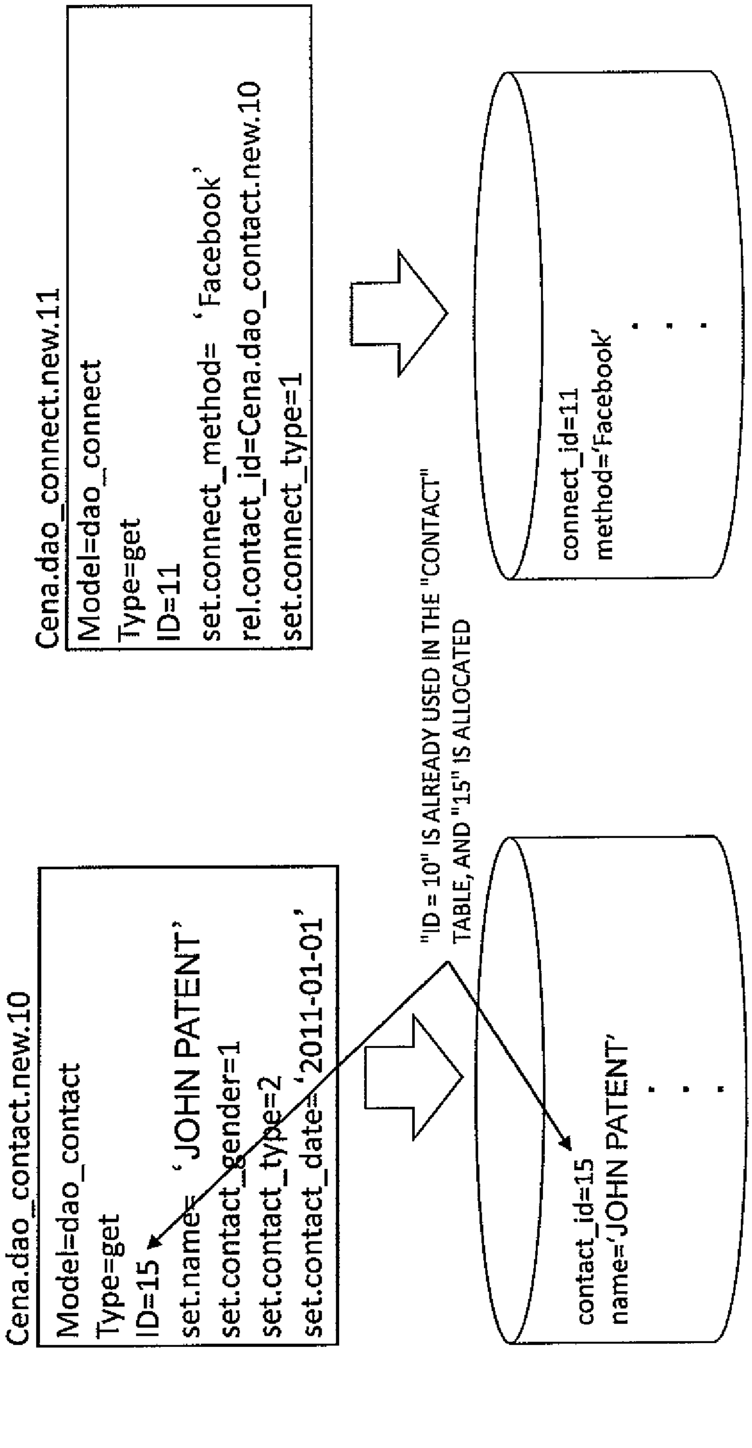
FIG. 14 is a view schematically showing an example of a data save in system A.

In FIG. 14, and object is generated based on the Cena descriptor shown in FIG. 10. Specifically, "Cena.dao_contact.new.10" is the object name because up to four attributes from the top are set as the object name in the case of the Cena descriptors shown in FIG. 10. The object name is correlated based on each of the Cena descriptors, and the attributes of the objects are saved in corresponding fashion.

The attributes inside an object can thus be modified by the save process in S160, but the relation between objects is not affected because these are recognized as the same object. In other words, in FIG. 14, "15" is automatically allocated during saving because "10" is already being used as the "contact_id" in the "dao_contact" table. This caused the "ID" of the internal attributes of the "Cena.dao_contact.new" object to change, but the object-indicating Cena descriptor itself is not changed, and the relation between the objects is preserved.

The "Type" of the object of the other party can also be confirmed when a relation is saved in S160. If the "Type" is "get," the "ID" of the object is in accord with the primary key (ID) in the database of the reflection destination. In view of this, the "ID" is acquired before the object is saved, and the relation can be saved to the database. The "ID" is sometimes changed in a case in which the "Type" is "new," and the "ID" obtained after the saving of the objet that is the relation destination is therefore used in this case.

It is thus determined whether all the relational properties among objects that were determined in S120 have been saved (S170), and the process is completed in the case in which all of the relations have been saved. S180 and subsequent processes are executed if this is not the case. Specifically, the data processing system 1 executes the relation update process in the relation updater 15 (S180).

Specifically, the relation in database A can be indicated after the save processor 14 executes the save process for database A. Therefore, the relation updater 15 loads the "ID" (primary key) in the object saved from the related object (S180), and saves the "ID" in a record based on the "Type" in the Cena descriptor (S190).

Figure 15:
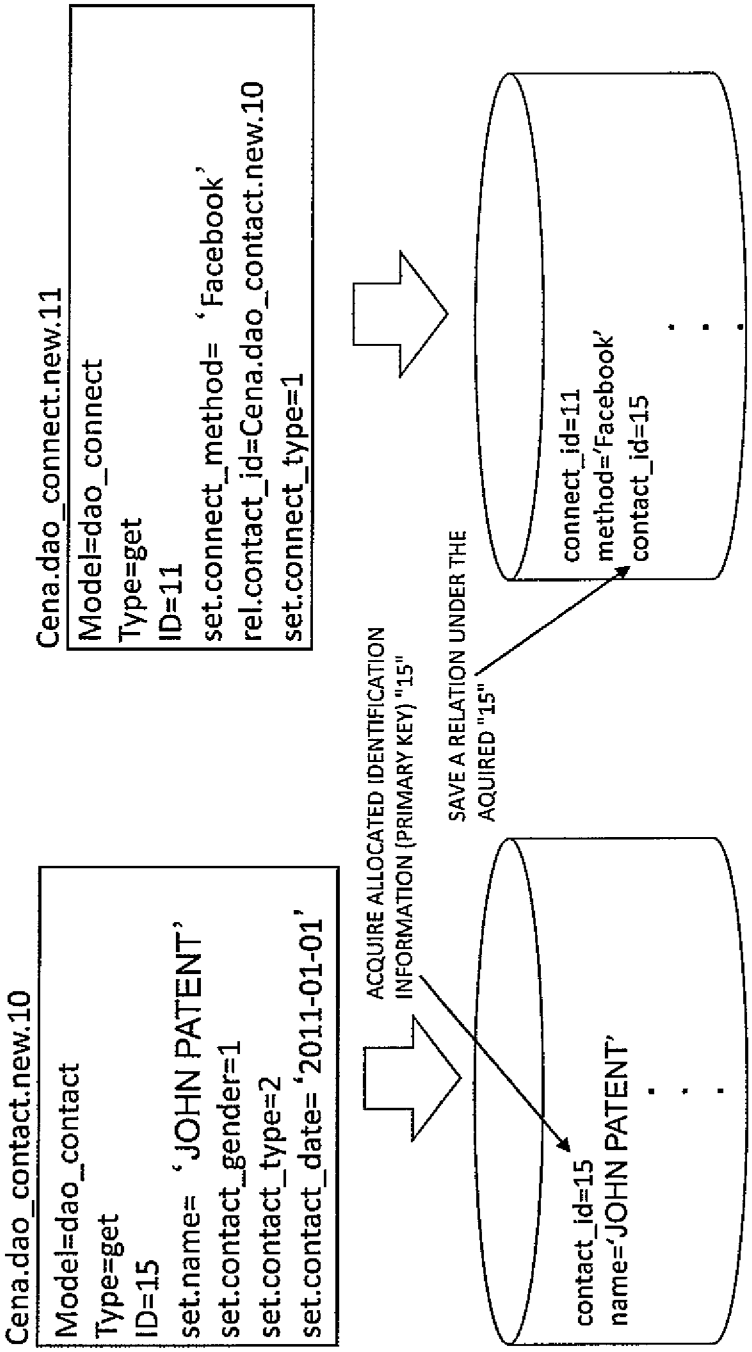
FIG. 15 is a view schematically showing an example of a saved relation among data in system A.

In the case of the example described above, when the "Cena.dao_contact.new.10" object related to the "Cena.dao_connect.11" object is saved, the relation updater 15 loads the allocated "ID" of "15" because the final "ID" (primary key) allocated to the object is allocated as "15" (S180). The "contact_id" of the "Cena.dao_connect.new.11" object is concluded to be a loaded "15," and the relation is saved (S190). This is shown schematically in FIG. 15. An example of a screen showing the results of reflecting the relational properties and saving the data is shown in FIG. 16.

By executing such processes, coordination between data can be maintained without the use of flags even in cases in which data in two databases is added, modified, or otherwise manipulated.

Processes similar to those described above can also be executed using an array or an associative array as an object. Specifically, data to be reflected in an array may be saved and the array may be loaded by a Cena descriptor.

First, an array is generated from the data to be transferred. The array is set so as to be referenced using the Cena descriptor described above. Because the relation between the records is subsequently indicated using the Cena descriptor, the related array is found from the Cena descriptor, and the result is indicated as a relation between arrays. After the generation of the necessary arrays and the relation between the arrays is completed, the arrays are saved to the actual database. Once the arrays are saved, the data of the arrays is updated to a saved content. The "Type" is updated to "get" after the data is saved to the system (system 3 in this case) that received the transfer. The relation in the database can be indicated after the save process is completed. Therefore, the saved "ID" (primary key) is loaded from the related array, and the "ID" is correlated and saved in its own record.

The process can be implemented even in a case in which an array or an associative array is used by executing such a process.

Relational properties can be preserved in a simple manner in a case in which the corresponding relation is indicated using a Cena descriptor used in the data processing system 1 of the present invention. This point is explained below. The processes below also have the same portions as the flowchart of FIG. 3 described above.

Following is a description of a case in which data added in system 2 is recorded in system 3 in the same manner as above. Therefore, for example, the data shown in FIG. 17 is sent from system 2 to system 3. FIG. 17 shows a case in which "John Patent" is added as a record of the primary key "10" in the "dao_contact" table, "Facebook" is added as a record of the primary key "11" in the "dao_connect" table, and the record is correlated with the record of the primary key "10" in the "dao_contact" table.

When the data of FIG. 17 is acquired from system 2 by system 3, the data is saved to database A. An unused "ID," for example, "15," is allocated in the case in which the "ID" of "10" is already being used in database A.

"Type" is switched to "get," and the object is saved with the "ID" of the "contact" table as "15" by being saved in database A. This is shown schematically in FIG. 18.

Figures 18, 19:
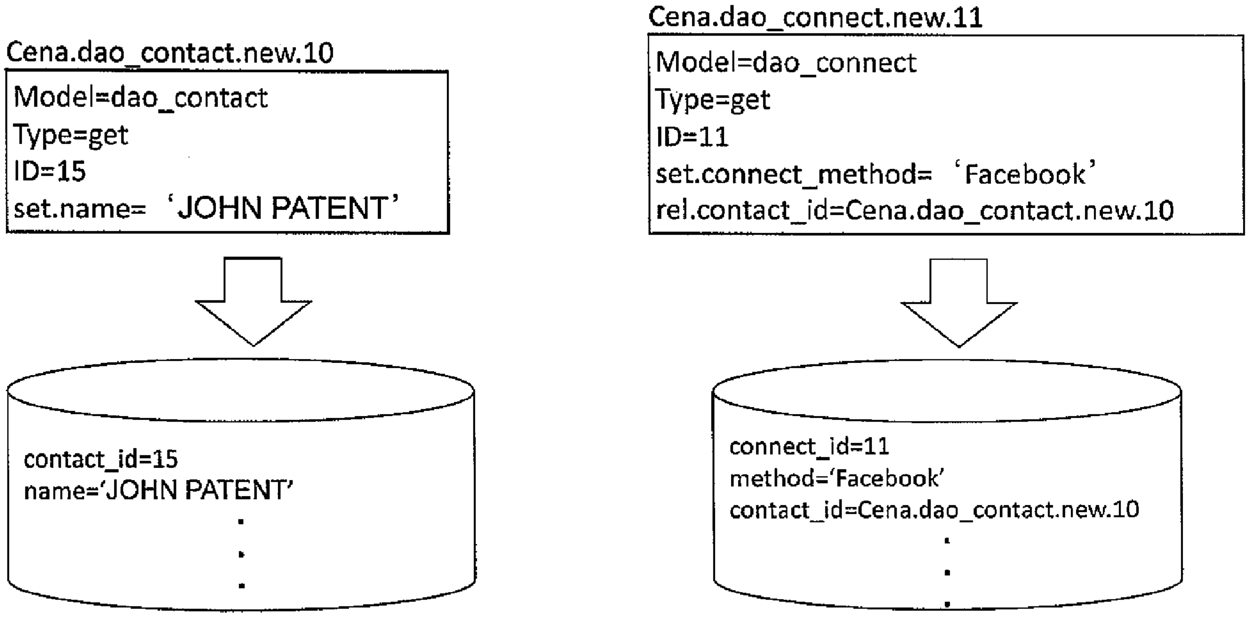
FIG. 18 is a view schematically showing an example of a data save.
FIG. 19 is a view schematically showing an example of a relation for a pre- and post-save Cena descriptor.

A relation to database A is created for the pre- and post-save Cena descriptor. The case of FIG. 18 is shown in FIG. 19. The pre-save Cena descriptor is converted to the post-save Cena descriptor from the relations before and after the save to system A.

Figure 20:
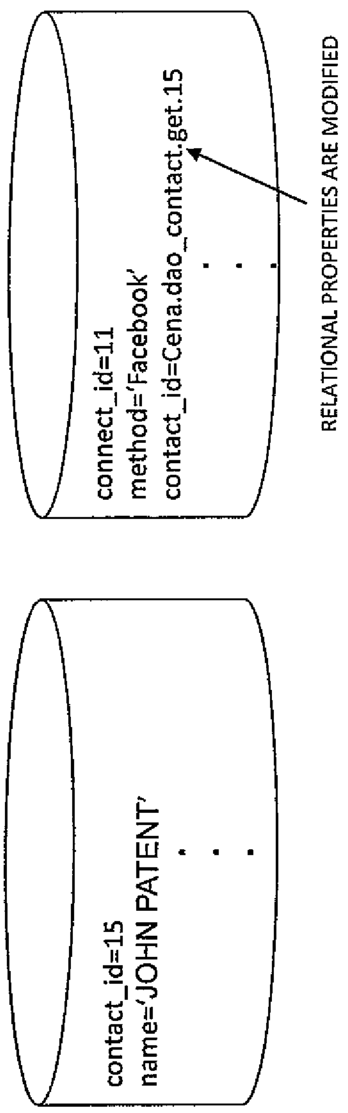
FIG. 20 is a view schematically showing an example of a case in which relational properties have been converted.

In the example described above, the relational properties are converted in the "dao_connect" table because the "ID" is modified to "contact_id=15" in the "dao_contact" table. Specifically, "Cena.dao_contact.new.10" is converted to "Cena.dao_contact.get.15." This is shown schematically in FIG. 20.

Thus, the Cena descriptor uniquely assigns all of the data (data existing in the system and newly recorded data). In other words, the relational properties of the data can be updated by performing a simple text conversion because the Cena descriptor itself is a unique character string. This is extracted by acquiring the "ID" (or primary key in the case of a database) from the Cena descriptor during saving to a database.

The database that is the reflection origin (system 2), and the database on the side that received the transmission, can be synchronized using the modification history of the Cena descriptor in a case in which synchronism is established between systems 2 and 3. The modification history obtained by the above process can be sent to the system that is the transmission origin (system 2), and the relation and the "ID" in the database (or the primary key in the case of a database) in the transmission origin system (system 2) can be updated using the modification history.

Coordination between data can be maintained without the use of flags even when the data relational properties are modified in a case in which the data is reflected from a data aggregate to a separate data aggregate by the data processing system 1 described above.

The invention claimed is:

1. A data processing system for causing data recorded in a second data aggregate to be reflected in a first data aggregate, the data processing system comprising:

a data acquisition part for acquiring data that is generated from the data recorded in the second data aggregate, and is described by a descriptor including at least "Model," "Type," and "ID" as attributes, the attribute, "Type," defining a condition of whether the acquired data is present in the first data aggregate when the first data aggregate is compared to the second data aggregate;

an object generator for extracting, as an object name, designated attributes in the descriptor of the data acquired by the data acquisition part, setting the designated attributes in the descriptor as internal attributes of one or more objects, and generating the one or more objects by correlating the object name and the internal attributes for each respective object of the one or more generated objects;

a reference relation processor for determining a reference relation among the one or more generated objects, wherein the determined reference relation is based upon a designated, internal attribute, "Type";

a save processor for saving the one or more generated objects in the first data aggregate; and a relation updater for extracting, based on the reference relation determined by the reference relation processor an "ID" among the one or more generated objects, and using the extracted "ID" to update the internal attributes of the one or more generated objects.

2. The data processing system according to claim 1, wherein:

the object generator extracts, as the object name, at least "Model," "Type," and "ID" in the descriptor, sets the designated attributes in the descriptor as the internal attributes of the one or more objects, and generates the one or more objects by correlating the object name and the internal attributes for each respective object of the one or more generated objects.

3. The data processing system of claim 1 or 2, wherein:

the object generator extracts, as an object name, at least "Model," "Type," and "ID" in the descriptor, sets the designated attributes in the descriptor as the internal attributes of the one or more objects, and generates the one or more objects by correlating the object name and the internal attributes for each respective object of the one or more generated objects; and the save processor, whereupon an identical "ID" matching the "ID" in the descriptor is used in the first data aggregate when the one or more generated objects is saved, assigns a different "ID" from the "ID" in the descriptor, updates the "ID" in the internal attributes of the one or more generated objects with the assigned "ID", and saves the one or more generated objects to the first data aggregate.

4. A data processing system, comprising:

a computer terminal, for causing data recorded in a second data aggregate to be reflected in a first data aggregate, the computer terminal performs the functions of:

a data acquisition part for acquiring data that is generated from the data recorded in the second data aggregate, and is described by a descriptor including at least "Model," "Type," and "ID" as attributes, the attribute, "Type," defining a condition of whether the acquired data is present in the first data aggregate when the first data aggregate is compared to the second data aggregate;

an object generator for extracting, as an object name, designated attributes in the descriptor of the data acquired by the data acquisition part, setting the designated attributes in the descriptor as internal attributes of one or more objects, and generating the one or more objects by correlating the object name and the internal attributes for each respective object of the one or more generated objects;

a reference relation processor for determining a reference relation among the one or more generated objects, wherein the determined reference relation is based upon a designated, internal attribute, "Type";

a save processor for saving the one or more generated objects in the first data aggregate; and a relation updater for extracting, based on the reference relation determined by the reference relation processor, an "ID" among the one or more generated objects, and using the extracted "ID" to update the internal attributes of the one or more generated objects.

* * * * *